US011105282B2

(12) United States Patent
Sukegawa et al.

(10) Patent No.: US 11,105,282 B2
(45) Date of Patent: Aug. 31, 2021

(54) CONTROL DEVICE AND CONTROL METHOD

(71) Applicant: Hitachi Automotive Systems, Ltd., Hitachinaka (JP)

(72) Inventors: Yoshihiro Sukegawa, Tokyo (JP); Atsushi Shimada, Tokyo (JP); Masayuki Saruwatari, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 17/051,358

(22) PCT Filed: Apr. 22, 2019

(86) PCT No.: PCT/JP2019/016929
§ 371 (c)(1),
(2) Date: Oct. 28, 2020

(87) PCT Pub. No.: WO2019/230251
PCT Pub. Date: Dec. 5, 2019

(65) Prior Publication Data
US 2021/0095608 A1    Apr. 1, 2021

(30) Foreign Application Priority Data

May 28, 2018    (JP) .............................. JP2018-101763

(51) Int. Cl.
*F02D 41/00*    (2006.01)
*F02M 25/022*    (2006.01)
*F02M 25/03*    (2006.01)

(52) U.S. Cl.
CPC ..... *F02D 41/0025* (2013.01); *F02M 25/0222* (2013.01); *F02M 25/03* (2013.01);
(Continued)

(58) Field of Classification Search
CPC . F02M 25/03; F02M 25/0222; F02D 41/0025
See application file for complete search history.

(56) References Cited

U.S. PATENT DOCUMENTS 5,542,379 A * 8/1996 Kessler ................... F02D 19/12
123/25 C
2011/0174263 A1* 7/2011 Leone ................... F02P 5/1527
123/25 C

FOREIGN PATENT DOCUMENTS

JP    S57-076263 U    5/1982
JP    S60-230554 A    11/1985
(Continued)

OTHER PUBLICATIONS

International Search Report with English translation and Written Opinion issued in corresponding application No. PCT/JP201/016929 dated Jul. 16, 2019.

*Primary Examiner* — Kevin A Lathers
(74) *Attorney, Agent, or Firm* — Foley & Lardner LLP (57) ABSTRACT

Provided is a control device for an internal combustion engine, which can control an injection amount of water injected into each cylinder of the internal combustion engine to a minimum injection amount that allows knock to be suppressed for each cylinder. Therefore, in a control device 1 that controls water supply valves 35 (water supply devices) that supply water into each of combustion chambers of a plurality of cylinders R (cylinders R1 to R3 in the embodiment) of an internal combustion engine 100, the control device 1 includes a water supply amount calculation unit 2 that calculates a supply amount of water supplied to each of the combustion chambers of the plurality of cylinders R1 to R3 for each cylinder, and a water supply control unit 3 that controls the water supply valves 35 based on the supply amount of water calculated by the water supply amount calculation unit 2 for each cylinder.

12 Claims, 6 Drawing Sheets

(52) U.S. Cl.
CPC .... *F02D 2200/023* (2013.01); *F02D 2200/06* (2013.01); *F02D 2200/101* (2013.01); *F02D 2200/70* (2013.01)

(56) References Cited

FOREIGN PATENT DOCUMENTS

| | | |
|---|---|---|
| JP | H07-501373 A | 2/1995 |
| JP | 2017-141726 A | 8/2017 |

\* cited by examiner

CONTROL DEVICE AND CONTROL METHOD

TECHNICAL FIELD

The present invention relates to a control device and a control method.

BACKGROUND ART

In recent years, in vehicles such as automobiles, regulations on fuel consumption amount (hereinafter, also referred to as fuel consumption) and exhaust gas harmful components have been tightened, and such regulations are likely to be further tightened in the future.

In particular, regulations on fuel consumption are matters of great interest due to problems such as soaring fuel prices, influences on global warming, and exhaustion of energy resources.

Under such circumstances, for example, in the automobile industry, the spark ignition engine is being supercharged and the compression ratio is being made high in order to improve the fuel efficiency of the vehicle. In a supercharged engine and a high compression ratio engine, suppression of knocking (hereinafter, also referred to as knock) is a challenge. In view of this, for example, a control device for an internal combustion engine described in JP 2017-141726 A (PTL 1) includes a water injection device that injects cooling water into a combustion chamber, and increases an injection amount of water as knock increases based on an output signal of a knock sensor or an in-cylinder pressure sensor.

CITATION LIST

Patent Literature

PTL 1: JP 2017-141726 A

SUMMARY OF INVENTION

Technical Problem

In such an internal combustion engine including the water injection device, it is desirable to reduce the amount of water injected in order to suppress knock. This is because when the consumption amount of water is large, the frequency of replenishing water increases, the user's labor increases, and the cost of the water increases.

If the water tank is increased in size in order to reduce the frequency of replenishing water, the weight of the vehicle increases and the mountability deteriorates. If the injection amount of water can be controlled to the minimum amount that allows knock to be suppressed according to the knock strength (likelihood of occurrence of knock), injection of excess water can be eliminated and consumption amount of water can be suppressed.

Most internal combustion engines are multi-cylinder engines having a plurality of cylinders. In such a multi-cylinder engine, the knock strength differs among the cylinders due to variations in cooling water temperature, air-fuel ratio, etc., among the cylinders.

Therefore, in the control device described in Patent Document 1, it is necessary to detect the knock strength for each cylinder in order to minimize the injection amount of water for each cylinder according to the knock strength.

In this type of multi-cylinder engine, one knock sensor that detects the strength of knock is installed in a cylinder block, and vibration generated in a plurality of cylinders is detected by this one knock sensor. However, since the distances between the cylinders and the knock sensor are different from each other and the propagation characteristics of vibrations between them are also different from each other, it is difficult to accurately detect the knock strength for each cylinder with one knock sensor. In order to detect the knock strength with a knock sensor for each cylinder, it is necessary to install knock sensors respectively for cylinders, resulting in increase in component cost and manufacturing cost.

Therefore, an object of the present invention is to provide a control device that can control an injection amount of water injected into each cylinder of an internal combustion engine to an appropriate injection amount that allows knocking to be suppressed for each cylinder.

Solution to Problem

In order to solve the above-mentioned problem, there is provided a control device that controls a water supply device that supplies water into each of combustion chambers of a plurality of cylinders of an internal combustion engine, the control device including: a water supply amount calculation unit that calculates a supply amount of water supplied to each of the combustion chambers of the plurality of cylinders for each of the cylinders; and a water supply control unit that controls the water supply device based on the supply amount of water calculated by the water supply amount calculation unit for each of the cylinders.

Advantageous Effects of Invention

According to the present invention, the injection amount of water injected into each cylinder of the internal combustion engine can be controlled to an appropriate injection amount that allows knocking to be suppressed for each cylinder.

DESCRIPTION OF EMBODIMENTS

Internal Combustion Engine

Hereinafter, embodiments of the present invention will be described in detail with reference to the drawings.

Figure 1:
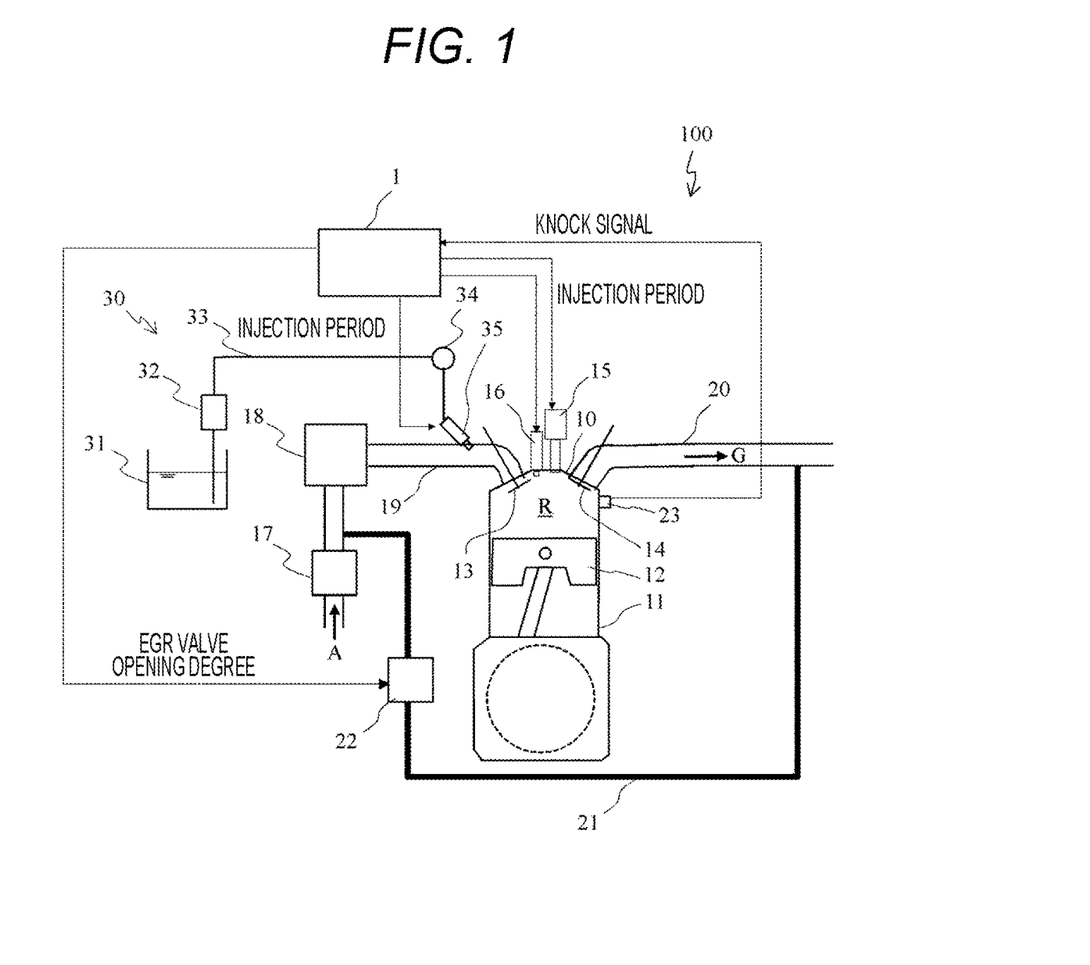
FIG. 1 is a schematic configuration diagram of an internal combustion engine and a control device.

FIG. 1 is a schematic configuration diagram of an internal combustion engine 100 and a control device 1.

Figure 2:
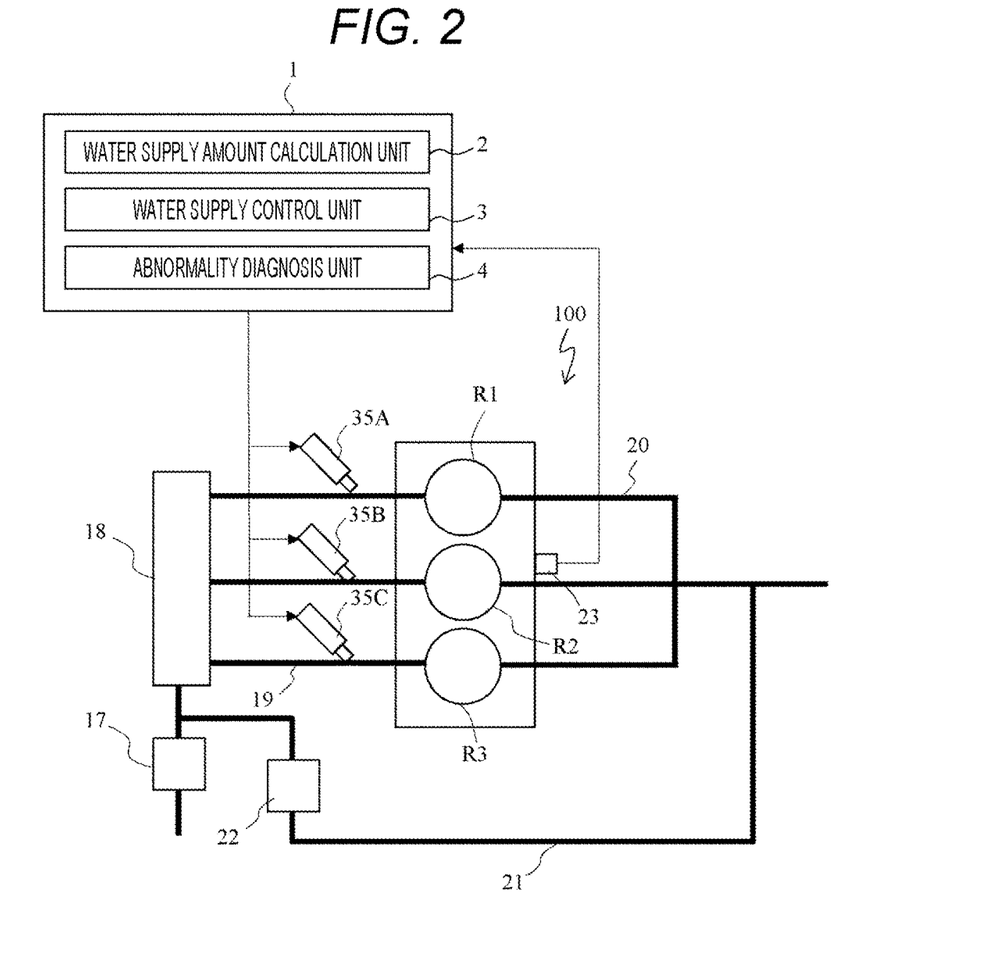
FIG. 2 is a plan diagram illustrating the configurations of the internal combustion engine and the control device illustrated in FIG. 1.

FIG. 2 is a plan diagram illustrating the configurations of the internal combustion engine 100 and the control device 1 illustrated in FIG. 1.

Figure 3:
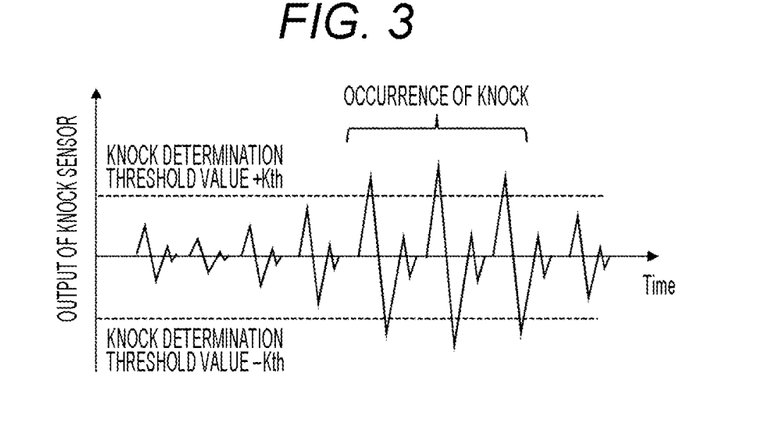
FIG. 3 is a diagram showing an example of an output waveform of a knock sensor.

FIG. 3 is a diagram showing an example of an output waveform of a knock sensor 23.

As illustrated in FIG. 1, an internal combustion engine 100 is a spark ignition type four-cycle gasoline type internal combustion engine, and includes a combustion chamber (hereinafter, also referred to as cylinder R) formed by a cylinder head 10, a cylinder 11, a piston 12, an intake valve 13, and an exhaust valve 14. A fuel injection valve 15 is provided to the cylinder head 10, and its injection nozzle penetrates into the cylinder R to constitute a so-called in-cylinder direct injection internal combustion engine. Further, a spark plug 16 is also provided to the cylinder head 10. Combustion air A is taken into the cylinder R through a throttle valve 17, a collector 18, and an intake pipe 19. Then, exhaust gas G after combustion is discharged through an exhaust pipe 20. Part of the exhaust gas G is returned to an intake passage of the throttle valve through an EGR pipe 21 and an EGR valve 22, which constitutes a so-called exhaust gas recirculation (EGR) system. The cylinder head 10 is provided with the knock sensor 23. The knock sensor 23 detects vibration of the cylinder head 10 and transmits the amplitude of the vibration to the control device 1 as a detection value.

Further, the internal combustion engine 100 of the embodiment includes a water injection device 30 that injects water for cooling the inside of the cylinder R. The water injection device 30 includes a water tank 31, a water pump 32, a water pipe 33, a common rail 34, and a water supply valve 35. The water in the water tank 31 is pressurized to about 3 to 5 atm by the water pump 32, and is pumped to the common rail 34 through the water pipe 33.

The water in the common rail 34 is injected into the intake pipe 19 from the water supply valve 35 provided to the intake pipe 19, and is supplied into the cylinder R together with the air A to cool the inside of the cylinder R.

A CPU (not illustrated) of the control device 1 controls an injection timing and an injection period of fuel by the fuel injection valve 15, an ignition timing by the spark plug 16, an injection timing and an injection period of water by the water supply valve 35, and opening degrees of the EGR valve and a throttle valve to control the internal combustion engine 100 to a predetermined operating state.

In FIG. 1, only a single cylinder is illustrated in order to illustrate the configuration of the combustion chamber of the internal combustion engine 100, but the internal combustion engine 100 in the embodiment of the present invention is a multi-cylinder internal combustion engine including two or more cylinders. Hereinafter, a three-cylinder internal combustion engine will be described as an example, and FIG. 2 illustrates a plan diagram of the internal combustion engine 100 and the control device 1 of FIG. 1 as viewed from above.

As illustrated in FIG. 2, in the internal combustion engine 100, three cylinders R1, R2, and R3 are arranged in series, and water supply valves 35A, 35B, and 35C are provided in the cylinders R1 to R3, respectively. The water supply valves 35A to 35C are independently provided in the cylinders R1 to R3, respectively, and the control device 1 can independently control the injection amounts of water to (injection period for) the cylinders R1 to R3.

Further, one knock sensor 23 is provided to the cylinder head 10. FIG. 3 shows an example of the detection result (the output waveform of the knock sensor 23) by the knock sensor 23 provided in common for each cylinder. The knock sensor 23 detects the vibration generated in each of the cylinders R1 to R3, and the time history of the output waveform is transmitted to the control device 1.

Control Device

Returning to FIG. 2, the control device 1 includes a water supply amount calculation unit 2 that calculates the supply amount of water to be supplied into each of the plurality of cylinders R1 to R3 for each of the cylinders R1 to R3, and a water supply control unit 3 that controls each of the water supply valves 35 based on the supply amount of water calculated for each of the cylinders R1 to R3 by the water supply amount calculation unit 2. The water supply amount calculation unit 2 detects the knocking strength while sequentially changing the supply amount of the water by each of the water supply valves 35 for each of the plurality of cylinders R1 to R3, and thus calculates the minimum supply amount of water at which knocking is the permissible limit or less for each of the cylinders R1 to R3. The water supply control unit 3 controls the water supply valves 35A to 35C so as to supply the minimum supply amount of water at which knocking is the permissible limit or less from the water supply valves 35A to 35C into the cylinders R1 to R3, respectively, based on the minimum supply amount of water for each of the cylinders R1 to R3 calculated by the water supply amount calculation unit 2.

In the control device 1, the vibration amplitude of each of the cylinders R1 to R3 detected by the common knock sensor 23 is compared with a predetermined knock determination threshold value Kth, and if the detected vibration amplitude exceeds the knock determination threshold value Kth, it is determined that knocking has occurred. If the detected vibration amplitude does not exceed the knock determination threshold value Kth, it is determined that knocking has not occurred. As for the knock determination threshold value Kth, an upper knock determination threshold value +Kth and a lower knock determination threshold value −Kth are set for the vibration amplitude 0 (zero) (see FIG. 3). As described above, when the number of knock sensors 23 is one, the distances between the respective cylinders R1 to R3 and the knock sensor 23 are different from each other, and the vibration propagation characteristics between them are also different from each other. Therefore, it is difficult to detect the knock strength for each of the cylinders R1 to R3. Therefore, in the embodiment, the output of the knock sensor 23 is used only for determining whether or not knocking has occurred in any of the cylinders R1 to R3.

The water injection device 30 provided in the internal combustion engine 100 described above is used to suppress knocking of the internal combustion engine 100. That is, when the water is supplied to each of the cylinders R1 to R3 by the water injection device 30, the temperature of the air-fuel mixture is lowered by the cooling effect associated with the vaporization of water, and knocking is suppressed. Since the cooling effect increases as the supply amount of water into each of the cylinders R1 to R3 increases, the knocking suppression effect also increases as the supply amount of water into each of the cylinders R1 to R3 increases. On the other hand, there is a permissible limit for knocking due to noise of the internal combustion engine 100 caused by knocking and the soundness of the internal combustion engine 100, and if knocking is suppressed by injection of water into each of the cylinders R1 to R3 and falls below the permissible limit, supplying a larger amount of water into each of the cylinders R1 to R3 is a waste of water. Further, the supply of excess water into each of the cylinders R1 to R3 may cause partial extinction of the flame, resulting in deterioration of combustion efficiency. Therefore, it is required that the amount of water supplied to each of the cylinders R1 to R3 be set to a minimum supply amount that is below the permissible limit of knocking at the minimum. It should be noted that a state where knocking does not occur is included in "the permissible limit or less of knocking".

Generally, in a multi-cylinder engine, operating conditions and environmental conditions such as a cooling water temperature, an oil temperature, an air-fuel ratio, an EGR rate, an air intake amount, and an outside air temperature vary among the cylinders R1 to R3. Due to this variation, the likelihood of knocking and the knocking strength differ among the cylinders. Therefore, the minimum supply amount of water for suppressing knocking to fall below the permissible limit differs among the cylinders R1 to R3. The variations among the cylinders R1 to R3 are due to differences in layout of a cooling water passage, an intake passage length, a manufacturing tolerance of a fuel injection valve, etc. Therefore, even if operating conditions and environmental conditions change, the order of the likelihood of knocking and the order of knocking strength of the cylinders R1 to R3 are often maintained. Therefore, when a distribution ratio (ratio of the minimum supply amount) of water supplied to each of the cylinders R1 to R3 is calculated in advance based on the order of the likelihood of knocking and the order of knocking strength of the cylinders R1 to R3, and the minimum supply amount of water is corrected while maintaining the distribution ratio of water calculated for each of the cylinders R1 to R3 according to changes in the operating condition and the environmental condition, the total consumption amount of water can be reduced as compared with the case of supplying water evenly to each of the cylinders R1 to R3.

In the present invention, the calculation of the distribution ratio of water for each of the cylinders R1 to R3 is performed in a water distribution ratio calculation mode of the water supply amount calculation unit 2 of the control device 1. The water distribution ratio calculation mode is performed, for example, during a test operation before shipment of the internal combustion engine 100. Further, in order to cope with the change with time of the internal combustion engine 100, it is desirable that the water distribution ratio calculation mode be executed every time the vehicle has operated for a certain time or every time the vehicle has traveled a certain distance.

Water Distribution Ratio Calculation Process

Figure 4:
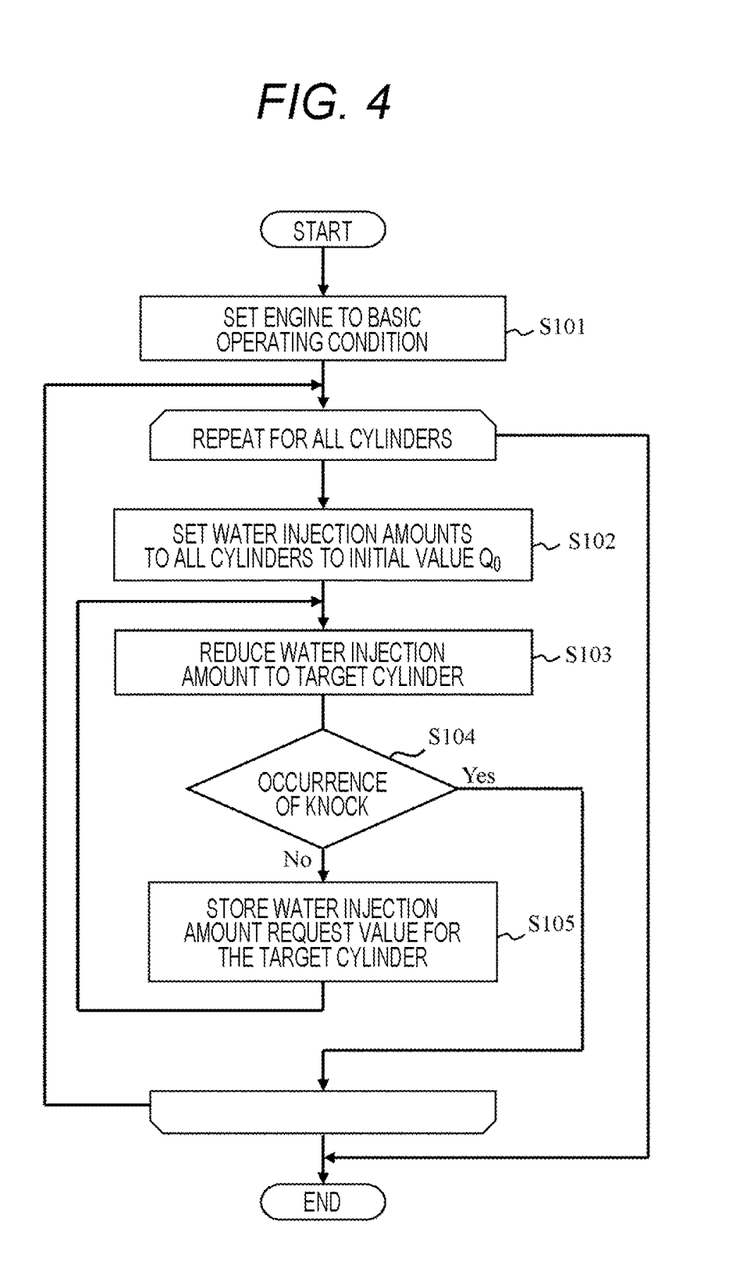
FIG. 4 is a flowchart of a process performed in a water distribution ratio calculation mode of a water supply amount calculation unit.

FIG. 4 is a flowchart of the water distribution ratio calculation process performed in the water distribution ratio calculation mode of the water supply amount calculation unit 2.

Figure 5:
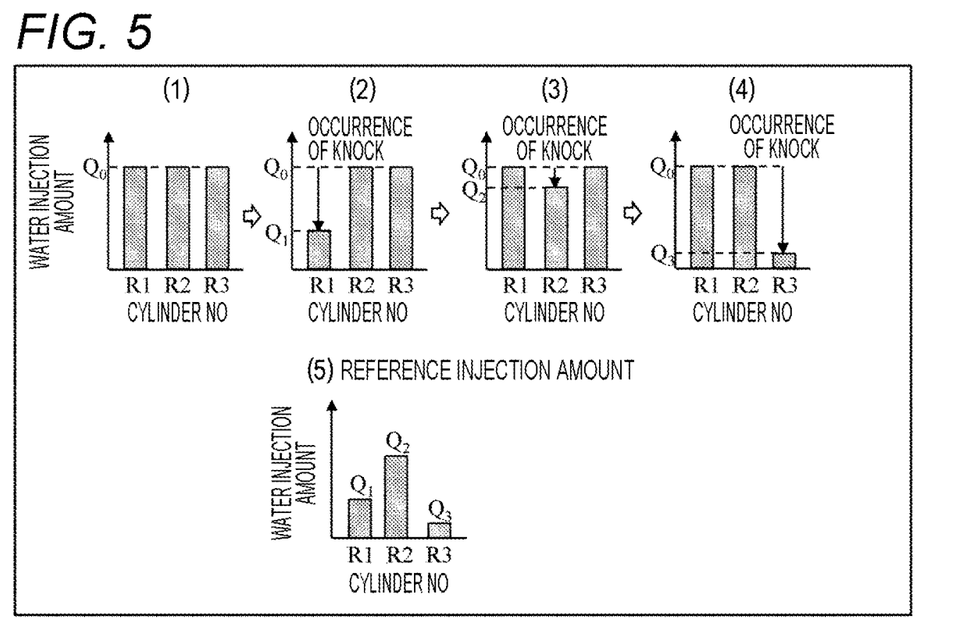
FIG. 5 is a diagram showing an example of a water injection amount for each cylinder calculated in a water distribution ratio calculation mode.

FIG. 5 is a diagram showing an example of the water injection amount (minimum supply amount) for each of the cylinders R1 to R3 calculated in the water distribution ratio calculation mode.

As illustrated in FIG. 4, the water supply amount calculation unit 2 sets the operating condition of the internal combustion engine 100 to a predetermined basic operating condition determined in advance (Step S101). Here, the basic operating condition is a condition under which knocking occurs in all the cylinders R1 to R3 in a state where water is not supplied to any of the cylinders R1 to R3. Therefore, it is desirable that the basic operating condition be a condition under which the operating condition of the internal combustion engine 100 is a high load and a low rotation speed, the EGR is not used, and the ignition timing is advanced. For example, the condition is such that, after the completion of warming up when the internal combustion engine 100 is sufficiently warmed after starting, the average effective pressure of 1 MPa, the EGR valve being closed, the rotation speed of 1,200 rpm, and the ignition timing of $-20°$ CA are satisfied.

Next, the water supply amount calculation unit 2 determines one target cylinder to be calculated in the injection amount of water (for example, the cylinder R1), and sets the injection amounts of water to all the cylinders R1 to R3 to an initial value Q0 (Step S102). Here, the initial value Q0 of the injection amount of water is a value that is set in advance so that knocking will be the permissible limit or less in any of the cylinders R1 to R3 under the basic operating condition. Further, the initial value Q0 is set to a value sufficiently larger than the minimum supply amount of water finally calculated by the water supply amount calculation unit 2.

Next, the water supply amount calculation unit 2 reduces the injection amount required value for the water supply valve 35A that injects water to the target cylinder R1 by a certain amount (for example, about $\frac{1}{10}$ of the initial value Q0 of the injection amount) to reduce the supply amount of water to the target cylinder R1 (Step S103), and determines the presence or absence of knock based on the output of the knock sensor 23 (Step S104). When determining that knocking has not occurred (Step S104: No), the water supply amount calculation unit 2 stores the water injection amount required value for the target cylinder R1 in the storage area and returns to Step S103.

On the other hand, when determining that knocking has occurred (Step S104: Yes), the water supply amount calculation unit 2 changes the target cylinder R1 to another cylinder (for example, the next cylinder R2).

The water supply amount calculation unit 2 sequentially executes the above-described steps S101 to S105 for all the cylinders R1 to R3, and ends the process in the water distribution ratio calculation mode. As a result, the minimum injection amount of water (hereinafter, the minimum supply amount Q) at which knocking is the permissible limit or less is obtained for each cylinder.

As described above, in a general multi-cylinder engine, the likelihood of knocking and the knocking strength differ among the cylinders. Therefore, as shown in FIG. 5, the minimum supply amount Q of water for keeping knocking below the permissible limit differs depending on the cylinder.

For example, the minimum supply amount Q3 of water in the cylinder R3 in which knocking is less likely to occur is smaller than the minimum supply amount Q2 of water in the cylinder R2 in which knocking is likely to occur. By determining the minimum supply amount Q of water for each cylinder, surplus water injection is suppressed, and the consumption amount of water can be reduced as compared with the case of injecting a uniform amount of water into each cylinder R.

The minimum supply amount Q obtained here is a reference supply amount (reference injection amount) under the standard operating condition, and the water injection required value can be determined by multiplying the standard supply amount by the correction coefficient k calculated according to the operating condition and the environmental condition of the vehicle. Here, it is desirable that the correction coefficient k be changed according to changes in the operating condition and the environmental condition such as engine torque and a rotation speed.

Figure 6:
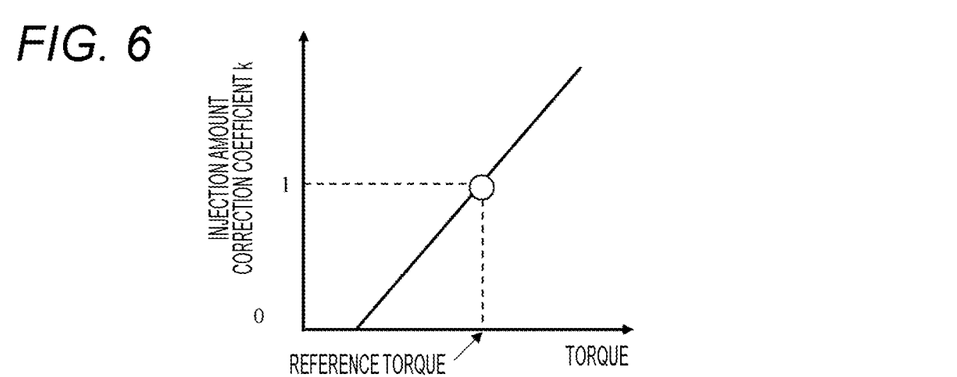
FIG. 6 is a diagram showing an example of the relationship between engine torque and a correction coefficient.

FIG. 6 is a diagram showing an example of the relationship between the engine torque and the correction coefficient k.

Figure 7:
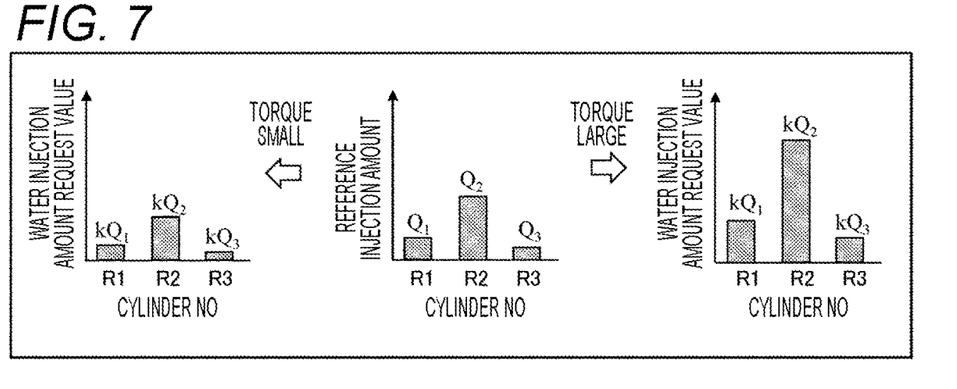
FIG. 7 is a diagram showing an example of the relationship between the engine torque and a water distribution amount.

FIG. 7 is a diagram showing an example of the relationship between the engine torque and the water distribution amount.

In the internal combustion engine 100, when the engine torque is high, knocking is more likely to occur than when the torque is low. Therefore, as show in FIG. 6, the water supply amount calculation unit 2 increases the correction coefficient k as the engine torque increases. When the correction coefficient k is increased as the engine torque increases in this way, as shown in FIG. 7, with the relationship (difference) in the water distribution amount determined in advance for each of the cylinders R1 to R3 being maintained, when the engine torque is larger than the predetermined reference torque, the injection amount of water is increased, and when the engine torque is smaller than the reference torque, the injection amount of water is decreased. Therefore, the control device 1 can efficiently suppress knocking due to water injection even when the engine torque changes. Further, even if the engine torque changes, the relationship (difference) in the water distribution amount for each cylinder is maintained, so that excessive water injection can be prevented.

The likelihood of occurrence of knocking is affected not only by the engine torque but also the engine rotation speed, the temperature of the cooling water, the temperature of the oil, the temperature of the outside air, the octane number of the fuel, the alcohol concentration of the fuel in the case of a mixed fuel of gasoline and alcohol, and the EGR rate in the exhaust gas recirculation system (EGR). Next, an example of changing the correction coefficient k according to the operating condition and the environmental condition of the internal combustion engine 100 will be described.

Figure 8:
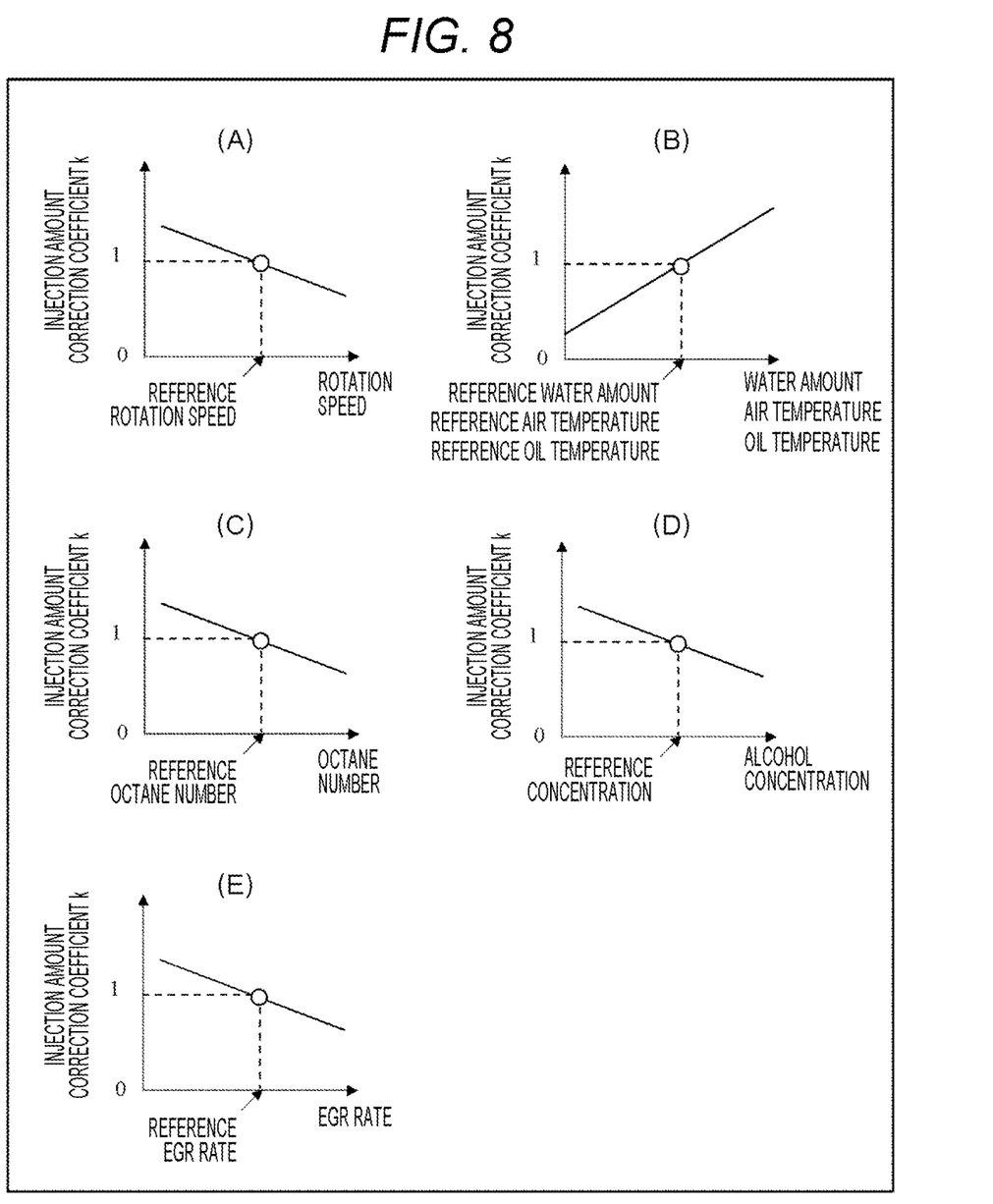
FIG. 8 is a diagram showing an example of the relationship between each parameter and the correction coefficient.

FIG. 8 is a diagram showing an example of the relationship between each parameter and the correction coefficient k.

First, as shown in (A) of FIG. 8, knocking is more likely to occur when the rotation speed of the internal combustion engine 100 is lower than when the rotation speed is high. Therefore, in the embodiment, the correction coefficient k is increased as the rotation speed of the internal combustion engine 100 decreases.

Further, as shown in (B) of FIG. 8, when the temperature of the cooling water, the oil temperature, or the temperature of the outside air is high, knocking is more likely to occur than when the temperature of the cooling water, the oil temperature, or the temperature of the outside air is low. Therefore, in the embodiment, the correction coefficient k is increased as temperature of the cooling water, the oil temperature, or the temperature of the outside air increases.

Further, as shown in (C) of FIG. 8, when the octane number of the fuel is low, knocking is more likely to occur than when the octane number of the fuel is high. Therefore, in the embodiment, the correction coefficient k is increased as the octane number decreases.

Further, as shown in (D) of FIG. 8, in the case where the fuel injected from the fuel injection valve 15 of the internal combustion engine 100 is a mixed fuel of gasoline and alcohol, when the alcohol concentration is low, knocking is more likely to occur than when the alcohol concentration is high. Therefore, in the embodiment, the correction coefficient k is increased as the alcohol concentration decreases.

Further, as shown in (E) of FIG. 8, when the EGR rate is low, knocking is more likely to occur than when the EGR rate is high. Therefore, in the embodiment, the correction coefficient k is increased as the EGR rate decreases.

Actually, a plurality of parameters are related to the likelihood of knocking. Therefore, the water supply amount calculation unit 2 may change the correction coefficient k by combining a plurality of parameters in order to calculate the minimum supply amount Q more accurately.

Figure 9:
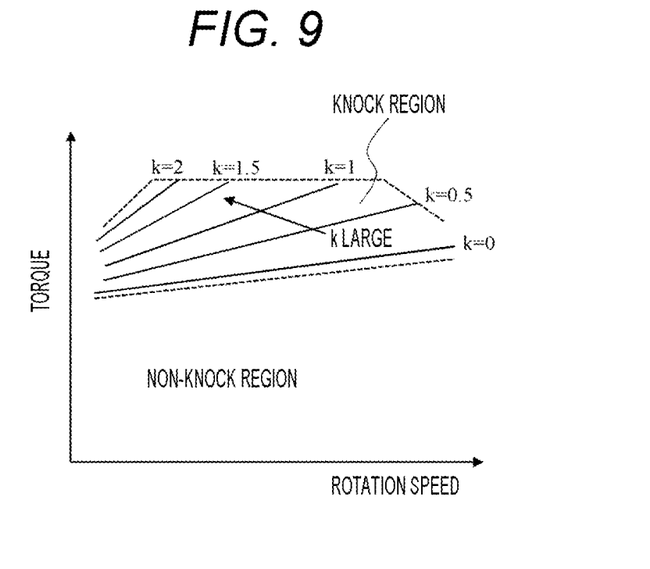
FIG. 9 is a diagram showing an example of the relationship between the engine torque, a rotation speed, and the correction coefficient.

FIG. 9 is a diagram showing an example of the relationship between the engine torque and the rotation speed and the correction coefficient k.

As shows in FIG. 9, the water supply amount calculation unit 2 may change the correction coefficient k in consideration of dependence on both the rotation speed of the internal combustion engine 100 and the torque (load) of the internal combustion engine 100. In this case, it is effective to give the correction coefficient k as two-dimensional map data on a plane defined by two parameters of the rotation speed of the internal combustion engine 100 and the torque of the internal combustion engine 100. Generally, in the internal combustion engine 100, since knocking is more likely to occur as the load increases and the rotation speed decreases, the water supply amount calculation unit 2 increases the correction coefficient k (for example, the correction coefficient k=2) based on the two-dimensional map data of the rotation speed of the internal combustion engine 100 and the torque of the internal combustion engine 100 shows in FIG. 9, and since knocking is less likely to occur as the load decreases and the rotation speed increases, the water supply amount calculation unit 2 decreases the correction coefficient k (for example, the correction coefficient k=0.5). Further, since, in a certain low load state, knocking does not occur or the knocking becomes the permissible limit or less, the correction coefficient k is set to 0 (zero), and water injection is not performed. Therefore, it is possible to further reduce the amount of water used as compared with the case where a constant amount of water is always injected.

In the above-described embodiment, the water distribution ratio calculation mode of the water supply amount calculation unit 2 is performed under one predetermined basic operating condition, and the injection amounts of water to the cylinders R1 to R3 are determined based on the one water distribution ratio thus obtained. However, the water distribution ratio calculation mode may be performed under a plurality of basic operating conditions, and the injection amounts of water to the cylinders R1 to R3 may be determined based on a plurality of water distribution ratios thus obtained.

Figure 10:
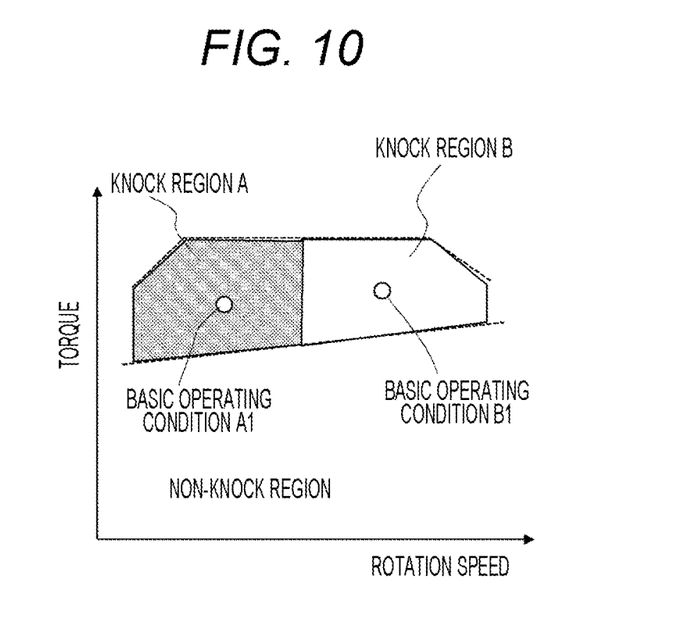
FIG. 10 is a diagram showing an example of a case of performing a plurality of water distribution ratio calculation modes under a plurality of basic operating conditions.

FIG. 10 is a diagram showing an example of the case of performing a plurality of water distribution ratio calculation modes under a plurality of basic operating conditions.

As shown in FIG. 10, the knock region on the two-dimensional map data defined by the rotation speed of the internal combustion engine 100 and the torque of the internal combustion engine 100 is divided into a knock region A on the low rotation side and a knock region B on the high rotation side, and the water supply amount calculation unit 2 obtains the distribution ratio of water to each of the cylinders R1 to R3 in the water distribution ratio calculation modes described above under a basic operating condition A1 in the knock region A and a basic operating condition B1 in the knock region B. Then, the water supply amount calculation unit 2 calculates the minimum supply amount of water in which knocking is below the permissible limit based on the water distribution ratio under the basic operating condition A1 in the knock region A, and calculates the minimum supply amount of water in which knocking is below the permissible limit based on the distribution ratio of water under the basic operating condition B1 in the knock region B. In this way, even if, due to a large change in the operating state of the internal combustion engine 100, the variation state among the cylinders in the temperature of the cooling water, the air-fuel ratio, the EGR rate, the air intake amount changes, the control device 1 can optimize the water injection amount by following the change.

Further, as described above, in order to cope with the change with time of the internal combustion engine 100, it is desirable that the water distribution ratio calculation mode be performed every predetermined operating time or every predetermined traveling distance of the internal combustion engine 100.

As shown in FIG. 3, the control device 1 includes an abnormality diagnosis unit 4 that diagnoses an abnormality of the internal combustion engine 100 based on the variation width of the basic supply amount of water below the permissible limit of knocking in each cylinder for every predetermined operating time or every predetermined traveling distance. The abnormality diagnosis unit 4 performs abnormality diagnosis of the internal combustion engine 100 from the comparison between the basic supply amount newly calculated in the water distribution ratio calculation mode by the water supply amount calculation unit 2 and the basic supply amount calculated at the previous timing. For example, when an absolute value of a change $\Delta Qn=Qn$ (new)$-Qn$(old) in the basic supply amount of the cylinder R1 is larger than a predetermined threshold value Qth, it is considered that the internal combustion engine 100 is abnormal, and it is possible to notify a user of the abnormality of the internal combustion engine 100 by turning on warning light.

According to the present invention, the water injection amount can be optimized according to the variation among the cylinders in the likelihood of knocking and the knock strength, and the water consumption amount due to water injection can be suppressed. As a result, there are advantages such as a reduction in user's labor and cost in water supply, a weight reduction due to a small capacity of the water tank, and a reduction in the installation space. In addition, it is possible to prevent excessive water supply to the combustion chamber and prevent deterioration of combustion efficiency due to partial extinction. Further, since the water injection amount can be optimized for each cylinder by using a single knock sensor, the cost can be kept low.

Furthermore, by calculating the water distribution ratio before shipment of the engine, every certain time, or every predetermined traveling distance, the calculation load, the increase in the water consumption amount, and the deterioration in the combustion and drivability that accompany the calculation of the water distribution ratio can be minimized.

As described above, in the embodiment,
(1) in the control device 1 that controls the water supply valves 35 (water supply devices) that supply water into each of the combustion chambers of the plurality of cylinders R (cylinders R1 to R3 in the embodiment) of the internal combustion engine 100, the control device 1 includes the water supply amount calculation unit 2 that calculates the supply amount of water supplied to each of the combustion chambers of the plurality of cylinders R1 to R3 for each cylinder, and the water supply control unit 3 that controls the water supply valves 35 based on the supply amount of water calculated by the water supply amount calculation unit 2 for each cylinder.

With this configuration, in the control device 1, the supply amount of water is calculated for each of the cylinders 1 to R3 by the water supply amount calculation unit 2, and the water supply valves 35 are controlled by the water supply control unit 3 based on the water supply amount of water for each cylinder calculated in the water supply amount calculation unit 2, so that the supply amount of water can be appropriately controlled for each of the cylinders R1 to R3. Therefore, in the control device 1, the supply amount of water for cooling the cylinder is set for each cylinder according to the likelihood of occurrence of knocking in each of the cylinders R1 to R3, so that the water can be appropriately supplied to each cylinder.

(2) Further, the water supply amount calculation unit 2 is configured to calculate the minimum supply amount of water at which knocking is the permissible limit or less for each of the cylinders R1 to R3 based on the knocking strength detected while changing the supply amount of the water by each of the water supply valves 35 for each of the plurality of cylinders R1 to R3.

With this configuration, the water supply control unit 3 can control the supply amount of water supplied to each of the cylinders R1 to R3 to the minimum supply amount at which knocking is below the permissible limit. Therefore, the control device 1 can minimize the consumption amount of water while suppressing the occurrence of knocking.

(3) Further, the water supply amount calculation unit 2 is configured to sequentially calculate the minimum supply amount of water at which knocking is the permissible limit or less for each of the cylinders R1 to R3 based on the knocking strength detected while sequentially changing the supply amount of the water by each of the water supply valves 35 for each of the plurality of cylinders R1 to R3.

With this configuration, the water supply amount calculation unit 2 can sequentially calculate the minimum supply amount of water at which knocking does not occur for each of the cylinders R1 to R3, and thus can effectively calculate the minimum supply amount of water for each cylinder.

(4) Further, the water supply amount calculation unit 2 is configured to calculate the minimum supply amount of water at which knocking is the permissible limit or less every preset operating time or every preset operating distance of the internal combustion engine 100.

With this configuration, the water supply amount calculation unit 2 calculates the minimum supply amount every predetermined operation time or every predetermined operation distance, so that the calculation load, the increase in the water consumption amount of water, and the deterioration in the combustion of the internal combustion engine and drivability that accompany the calculation of the water distribution ratio can be minimized.

(5) Further, the water supply amount calculation unit 2 is configured to correct the minimum supply amount of water based on the load (engine torque) of the internal combustion engine 100, the rotation speed of the internal combustion engine 100, the temperature of the cooling water, the oil temperature, the temperature of the outside air, the fuel property, and the EGR rate.

With this configuration, the likelihood of occurrence of knocking in the internal combustion engine 100 varies according to operating conditions such as the engine torque and the rotation speed and environmental conditions such as the temperature of the outside air, but the water supply amount calculation unit 2 corrects the minimum supply amount of water for each cylinder according to such operating conditions and environmental conditions, so that the minimum supply amount of water that can suppress the occurrence of knocking can be appropriately calculated.

(6) Further, the water supply amount calculation unit 2 is configured to perform correction so as to increase the minimum supply amount of water as the load of the internal combustion engine 100 increases.

Generally, when the load of the internal combustion engine 100 increases, knocking is likely to occur. Therefore, the water supply amount calculation unit 2 surely prevents the occurrence of knocking by performing correction so as to increase the minimum supply amount of water as the load of the internal combustion engine 100 increases.

(7) Further, the water supply amount calculation unit 2 is configured to perform correction so as to increase the minimum supply amount of water as the rotation speed of the internal combustion engine 100 decreases.

Generally, when the rotation speed of the internal combustion engine 100 decreases, knocking is likely to occur. Therefore, the water supply amount calculation unit 2 surely prevents the occurrence of knocking by performing correction so as to increase the minimum supply amount of water as the rotation speed of the internal combustion engine 100 decreases.

(8) Further, the water supply amount calculation unit 2 is configured to perform correction so as to increase the minimum supply amount of water as the cooling water temperature of the internal combustion engine 100, the oil temperature of the internal combustion engine 100, or the temperature of the outside air increases.

Generally, when the cooling water temperature of the internal combustion engine 100, the oil temperature, or the temperature of the outside air increases, knocking is likely to occur. Therefore, the water supply amount calculation unit 2 surely prevents the occurrence of knocking by performing correction so as to increase the minimum supply amount of water as the cooling water temperature of the internal combustion engine 100, the oil temperature, or the outside air temperature increases.

(9) Further, the water supply amount calculation unit 2 is configured to perform correction so as to increase the minimum supply amount of water as the octane number of the fuel decreases.

Generally, when the octane number of the fuel used in the internal combustion engine 100 decreases, knocking is likely to occur. Therefore, the water supply amount calculation unit 2 surely prevents the occurrence of knocking by performing correction so as to increase the minimum supply amount of water as the octane number of the fuel used in the internal combustion engine 100 decreases.

(10) Further, the water supply amount calculation unit 2 is configured to perform correction so as to increase the minimum supply amount of water as the alcohol concentration of the fuel decreases.

Generally, when the alcohol concentration of the fuel used in the internal combustion engine 100 decreases, knocking is likely to occur. Therefore, the water supply amount calculation unit 2 surely prevents the occurrence of knocking by performing correction so as to increase the minimum supply amount of water as the alcohol concentration of the fuel used in the internal combustion engine 100 decreases.

(11) Further, the water supply amount calculation unit 2 is configured to perform correction so as to increase the minimum supply amount of water as the EGR rate of the internal combustion engine 100 decreases.

Generally, when the EGR rate of the EGR system provided in the internal combustion engine 100 decreases, knocking is likely to occur. Therefore, the water supply amount calculation unit 2 surely prevents the occurrence of knocking by performing correction so as to increase the minimum supply amount of water as the EGR rate of the EGR system provided in the internal combustion engine 100 decreases.

(12) The common knock sensor 23 (knocking detection sensor) that detects knocking is provided in the internal combustion engine 100, and the water supply amount calculation unit 2 detects the knocking strength detected by the common knock sensor 23, and thus calculates the minimum supply amount of water at which knocking is the permissible limit or less for each of the cylinders R1 to R3.

With this configuration, knocking of each of the cylinders R1 to R3 is detected by the common knock sensor 23, and the water supply amount calculation unit 2 calculates the minimum supply amount of water at which knocking is the permissible limit or less for each of the cylinders R1 to R3 based on the knocking strength that is the detection result. Therefore, compared to the case where the knocking strengths of the cylinders are detected by the plurality of knock sensors 23 provided for the respective cylinders, knocking can be suppressed while the manufacturing cost is suppressed by the amount that the knock sensor 23 is shared.

(13) The control device 1 is configured to further include the abnormality diagnosis unit that diagnoses an abnormality of the internal combustion engine 100 based on the variation width of the supply amount of water calculated every preset operating time of the internal combustion engine 100 or the variation width of the supply amount of water calculated every preset operating distance of the internal combustion engine 100.

With this configuration, the abnormality diagnosis unit 4 can determine that the internal combustion engine 100 is abnormal when determining that the variation width of the supply amount of water calculated by the water supply amount calculation unit 2 every predetermined operating time or operating distance is larger than a predetermined threshold value that is set based on the variation width of the supply amount of water for every predetermined operating time or operating distance when the internal combustion engine 100 is operating normally.

In the embodiment described above, the case where the value when the knocking falls below the permissible limit from the state where the knocking exceeds the permissible limit is defined as the minimum supply amount has been described as an example. However, a value smaller by a predetermined value than a value when the knocking exceeds the permissible limit from the state where the knocking is below the permissible limit may be defined as the minimum supply amount.

Further, the present invention is not limited to the one including all the configurations of the above-described embodiment. A part of the configuration of the above-described embodiment may be replaced with the configuration of another embodiment, and further, the configuration of the above-described embodiment may be replaced with the configuration of another embodiment.

Moreover, a part of the configuration of the above-described embodiment may be added to, deleted from, or replaced with the configuration of another embodiment.

REFERENCE SIGNS LIST

1 control device
2 water supply amount calculation unit 3 water supply control unit
4 abnormality diagnosis unit
10 cylinder head
11 cylinder
12 piston
13 intake valve
14 exhaust valve
15 fuel injection valve
16 spark plug
17 throttle valve
18 collector
19 intake pipe
20 exhaust pipe
21: EGR pipe
22 EGR valve
23 knock sensor
30 water injection device
31 water tank
32 water pump
33 water pipe
34 common rail
35 water supply valve
100 internal combustion engine
A air
G exhaust gas
R1-R3 cylinder

The invention claimed is:

1. A control device that controls a water supply device that supplies water into each of combustion chambers of a plurality of cylinders of an internal combustion engine, the control device comprising:
   a water supply amount calculation unit that calculates a supply amount of water supplied to each of the combustion chambers of the plurality of cylinders for each of the cylinders; and
   a water supply control unit that controls the water supply device based on the supply amount of water calculated by the water supply amount calculation unit for each of the cylinders,
   wherein the water supply amount calculation unit calculates a minimum supply amount of water at which knocking is a permissible limit or less every preset operating time or every preset operating distance of the internal combustion engine, and
   wherein the water supply amount calculation unit corrects the minimum supply amount of water based on a load of the internal combustion engine, a rotation speed of the internal combustion engine, a temperature of cooling water, an oil temperature, a temperature of outside air, a fuel property, and an EGR rate.

2. The control device according to claim 1, wherein the water supply amount calculation unit calculates a minimum supply amount of water at which knocking is a permissible limit or less for each of the cylinders based on knocking strength detected according to a change in a supply amount of water by the water supply device for each of the plurality of cylinders.

3. The control device according to claim 2, wherein the water supply amount calculation unit sequentially calculates the minimum supply amount of water at which knocking is a permissible limit or less for each of the cylinders based on knocking strength sequentially detected according to a change in a supply amount of water by the water supply device for each of the plurality of cylinders.

4. The control device according to claim 1, wherein the water supply amount calculation unit performs correction so as to increase the minimum supply amount of water as the load of the internal combustion engine increases.

5. The control device according to claim 1, wherein the water supply amount calculation unit performs correction so as to increase the minimum supply amount of water as the rotation speed of the internal combustion engine decreases.

6. The control device according to claim 1, wherein the water supply amount calculation unit performs correction so as to increase the minimum supply amount of water as the cooling water temperature of the internal combustion engine, the oil temperature of the internal combustion engine, or the temperature of outside air increases.

7. The control device according to claim 1, wherein the water supply amount calculation unit performs correction so as to increase the minimum supply amount of water as an octane number of the fuel decreases.

8. The control device according to claim 1, wherein the water supply amount calculation unit performs correction so as to increase the minimum supply amount of water as an alcohol concentration of the fuel decreases.

9. The control device according to claim 1, wherein the water supply amount calculation unit performs correction so as to increase the minimum supply amount of water as the EGR rate of the internal combustion engine decreases.

10. The control device according to claim 1, wherein a common knocking detection sensor that detects knocking is provided in the internal combustion engine, and the water supply amount calculation unit detects knocking strength detected by the knocking detection sensor, and thus calculates a minimum supply amount of water at which knocking is a permissible limit or less for each of the cylinders.

11. The control device according to claim 1, further comprising an abnormality diagnosis unit that diagnoses an abnormality of the internal combustion engine based on a variation width of a supply amount of water calculated every preset operating time of the internal combustion equine or a variation width of a supply amount of water calculated every preset operating distance of the internal combustion engine.

12. A control method of controlling a water supply device including a water supply amount calculation unit, the water supply device supplying water into each of combustion chambers of a plurality of cylinders of an internal combustion engine, the control method comprising:
   a step of calculating a supply amount of water supplied to each of the combustion chambers of the plurality of cylinders for each of the cylinders;
   a step of calculating a minimum supply amount of water at which knocking is a permissible limit or less every preset operating time or every preset operating distance of the internal combustion engine;
   a step of correcting the minimum supply amount of water based on a load of the internal combustion engine, a rotation speed of the internal combustion engine, a temperature of cooling water, an oil temperature, a temperature of outside air, a fuel property, and an EGR rate; and
   a step of controlling the water supply device based on the supply amount of water calculated by the water supply amount calculation unit for each of the cylinders.

* * * * *